United States Patent

(12) United States Patent
Kawamura

(10) Patent No.: US 11,267,351 B2
(45) Date of Patent: Mar. 8, 2022

(54) POWER CONVERSION DEVICE

(71) Applicant: Mitsubishi Electric Corporation, Tokyo (JP)

(72) Inventor: Mao Kawamura, Tokyo (JP)

(73) Assignee: Mitsubishi Electric Cornoration, Tokyo (JP)

(*) Notice: Subject to any disclaimer, the term of this patent is extended or adjusted under 35 U.S.C. 154(b) by 351 days.

(21) Appl. No.: 16/333,398

(22) PCT Filed: Mar. 3, 2017

(86) PCT No.: PCT/JP2017/008424
§ 371 (c)(1),
(2) Date: Mar. 14, 2019

(87) PCT Pub. No.: WO2018/055792
PCT Pub. Date: Mar. 29, 2018

(65) Prior Publication Data
US 2020/0180451 A1 Jun. 11, 2020

(30) Foreign Application Priority Data
Sep. 21, 2016 (JP) .............................. JP2016-183670

(51) Int. Cl.
B60L 53/20 (2019.01)
H02M 1/00 (2006.01)

(52) U.S. Cl.
CPC ........... B60L 53/20 (2019.02); B60L 2210/14 (2013.01); B60L 2210/40 (2013.01); B60L 2240/525 (2013.01); H02M 1/0064 (2021.05)

(58) Field of Classification Search
CPC ................ B60L 53/20; B60L 2210/14; B60L 2240/525; B60L 2210/40; H02M 2201/0064
(Continued)

(56) References Cited

U.S. PATENT DOCUMENTS 10,189,370 B2 * 1/2019 Seo .................... B60L 58/30
10,199,956 B2 * 2/2019 Kitamoto ............. B60R 16/033
(Continued)

FOREIGN PATENT DOCUMENTS

JP   2006-103536 A   4/2006
JP   2008-086053 A   4/2008
(Continued)

OTHER PUBLICATIONS

Communication dated May 15, 2020, from the State Intellectual Property Office of the P.R.C in application No. 201780056997.4.
(Continued)

Primary Examiner — Sun J Lin
(74) Attorney, Agent, or Firm — Sughrue Mion, PLLC; Richard C. Turner

(57) ABSTRACT

In an electrical power conversion device including a step-up or boost converter and an inverter, a small-size and inexpensive power conversion device is provided in which its reactor and capacitors can be made more compact. The electrical power conversion device includes a boost converter connected to an electric energy storage device, an inverter connected on an output side of the boost converter, and a controller for performing a turn-on/turn-off control on semiconductor switching devices of the boost converter and semiconductor switching devices of the inverter; and the semiconductor switching devices of the boost converter are made of an SiC semiconductor, and the semiconductor switching devices of the inverter are made of an Si semiconductor.

7 Claims, 12 Drawing Sheets

(58) Field of Classification Search
USPC .......................................................... 320/109
See application file for complete search history.

(56) References Cited

U.S. PATENT DOCUMENTS

| | | | |
|---|---|---|---|
| 2012/0229061 A1 | 9/2012 | Itoh et al. | |
| 2012/0300523 A1 | 11/2012 | Sugiyama et al. | |
| 2015/0381074 A1* | 12/2015 | Flett | H02J 3/381 320/101 |
| 2017/0101028 A1* | 4/2017 | Hirai et al. | H02J 7/34 |
| 2017/0346398 A1* | 11/2017 | Long et al. | H02M 1/14 |

FOREIGN PATENT DOCUMENTS

| | | |
|---|---|---|
| JP | 2012-029549 A | 2/2012 |
| JP | 2013-093921 A | 5/2013 |
| JP | 2014-068428 A | 4/2014 |
| JP | 2014-072944 A | 4/2014 |
| JP | 2015-033153 A | 2/2015 |
| JP | 2015-089192 A | 5/2015 |
| JP | 2016-041012 A | 3/2016 |

OTHER PUBLICATIONS

Communication dated Aug. 28, 2019, from the European Patent Office in application No. 17852573.9.
Communication dated Dec. 8, 2020, from The China National Intellectual Property Administration in Application No. 201780056997.4.
International Search Report for PCT/JP2017/008424 dated Apr. 25, 2017[PCT/ISA/210].
Office Action dated Jun. 3, 2021 issued by the Chinese Patent Office in Chinese Application No. 201780056997.4.
Communication dated May 7, 2021, from the European Patent Office in application No. 17852573.9.

* cited by examiner

MODE 1

MODE 2

MODE 3 (D < 0.5)

MODE 4 (D > 0.5)

POWER CONVERSION DEVICE

CROSS REFERENCE TO RELATED APPLICATIONS

This application is a National Stage of International Application No. PCT/JP2017/008424 filed Mar. 3, 2017, claiming priority based on Japanese Patent Application No. 2016-183670 filed Sep. 21, 2019.

TECHNICAL FIELD

The present invention relates to an electrical power conversion device including a boost converter and an inverter using semiconductor switching devices and passive components.

BACKGROUND ART

In this day and age where a sharp change for the worse of the global environment, representative of global warming, and problems related to energy resource usages are argued, an electric automotive vehicle (EV: Electric Vehicle) and a hybrid automotive vehicle of HEV (Hybrid Electric Vehicle)/PHEV (Plug-in Hybrid Electric Vehicle) or the like are developed as environmentally friendly automotive vehicles.

Such an automotive vehicle mounts thereon, in addition to an auxiliary machine's battery mounted also on a conventional automotive vehicle for operating its control circuits, a driving battery which drives electric motors for running by means of electric power being charged.

In such an automotive vehicle, miniaturization of an electric motor-operated power-train component and cost reduction thereof are desired in the background of advances in a power electronics technology. As conventional technologies, there exist following technologies in which SiC (Silicon Carbide) semiconductor devices are utilized in order to make the construction in small size in a component system of an electric motor-operated power train (for example, refer to Patent Document 1 and Patent Document 2 described as follows).

Meanwhile, as for a conventional technology to make a reactor of a boost converter smaller in size, a technology is known in a DC/DC converter which includes smoothing capacitors C1 and C2 for smoothing respective input and output DC voltages V1 and V2, a smoothing capacitor C0 for functioning as an energy transferring capacitor, a plurality of semiconductor switching devices S1a, S1b, S2a and S2b (a first semiconductor switching device group), and a reactor L for storing electrical energy for voltage conversion; and in the DC/DC converter, by controlling an average voltage of the smoothing capacitor C0 so as to become ½ of the output DC voltage V2, a ripple voltage applied to the reactor L is made smaller, and also a frequency of the ripple voltage applied to the reactor L is made two times as large as a switching frequency, and so, the reactor is made smaller in size (for example, refer to Patent Document 3 described as follows).

RELATED ART DOCUMENTS

Patent Documents

[Patent Document 1] Japanese Laid-Open Patent Publication No. 2008-86053

[Patent Document 2] Japanese Laid-Open Patent Publication No. 2006-103536

[Patent Document 3] Japanese Laid-Open Patent Publication No. 2016-41012

SUMMARY OF THE INVENTION

Problems to be Solved by the Invention

A converter circuit of Patent Document 1 is a circuit in which SiC devices are used for switching devices, whereby high-speed performance of their switching speeds are achieved, and also, switching operations are made possible in a high temperature region, so that the miniaturization is achieved. In addition, in a cooling system of Patent Document 2 including an inverter and a motor, SiC semiconductor devices are used for the system, whereby heat resistance of the switching devices is enhanced, and stable operations can be performed even when an operating temperature of the inverter increases, so that complication of the cooling system is curbed, and the reduction of the number of components, simplification of the configuration and miniaturization thereof are achieved.

However, in an electrical power conversion device constituted of an inverter(s) and a converter(s), the usage of an SiC semiconductor device for each of semiconductor switching devices results in a very expensive electrical power conversion device in comparison with a case of the usage of an Si (Silicon) semiconductor device therefor, so that the costs of the electrical power conversion device increase. In addition, in an inverter, its switching frequency influences on losses (copper loss and iron loss) of motors on load sides, and thus, a driving frequency of the inverter cannot also be altered, if the motors are not changed.

Moreover, in the DC/DC converter of Patent Document 3, an intermediate capacitor is separately required in order to make a reactor smaller in comparison with that for a general single transistor type converter and in order to mitigate a voltage applied to the reactor, and thus, an electrical power conversion device cannot be made smaller in its entirety. Furthermore, there exists a feature that low voltage-withstand devices can be used for driving devices of the boost converter in the electrical power conversion device described above; however, a high voltage is applied to another remaining low voltage-withstand device(s) when a semiconductor device(s) causes a short circuiting fault, and so, there exists a possibility that the withstand voltage of the device(s) is exceeded, so that double faults are caused. Because of these, when countermeasures at the time of the faults is taken in consideration, the devices of low voltage-withstand cannot be used, and thus, the costs increase.

The present invention has been directed at solving these problems described above, and an object of the invention is to provide a small-size and inexpensive electrical power conversion device in such a manner that, in an electrical power conversion device including a step-up or boost converter and an inverter(s), SiC semiconductor devices and Si semiconductor devices are utilized in the right place at the right time, and a circuit configuration of the boost converter is optimized.

Means for Solving the Problems

An electrical power conversion device according to the present invention comprises: a boost converter connected to an electric energy storage device; an inverter connected on an output side of the boost converter; and a controller for performing a turn-on/turn-off control on switching devices of the boost converter and on those of the inverter, wherein semiconductor switching devices of the boost converter are made of an SiC semiconductor, and semiconductor switching devices of the inverter are made of an Si semiconductor.

Effects of the Invention

According to the present invention, by utilizing the semiconductor switching devices made of SiC semiconductors for the boost converter, and the semiconductor switching devices made of Si semiconductors for the inverter, the SiC semiconductor switching devices are fast in their switching speeds in comparison with those of conventional Si semiconductor switching devices, so that switching losses are small; and thus, a switching frequency can be made higher in frequency without lowering conversion efficiency, and a reactor(s) largely contributing to the size of the electrical power conversion device can be constructed in small size. In addition, a ripple current of the reactor(s) can be reduced by means of high frequency performance, and also, a capacitor(s) can be made more compact. Meanwhile, because the inverter exhibits a smaller degree of contribution to a more compact size of the electrical power conversion device by means of high frequency performance, the Si devices are used for the inverter, whereby the costs are curbed, and a small-size and inexpensive electrical power conversion device is provided.

EMBODIMENTS FOR CARRYING OUT THE INVENTION

Figure 1:
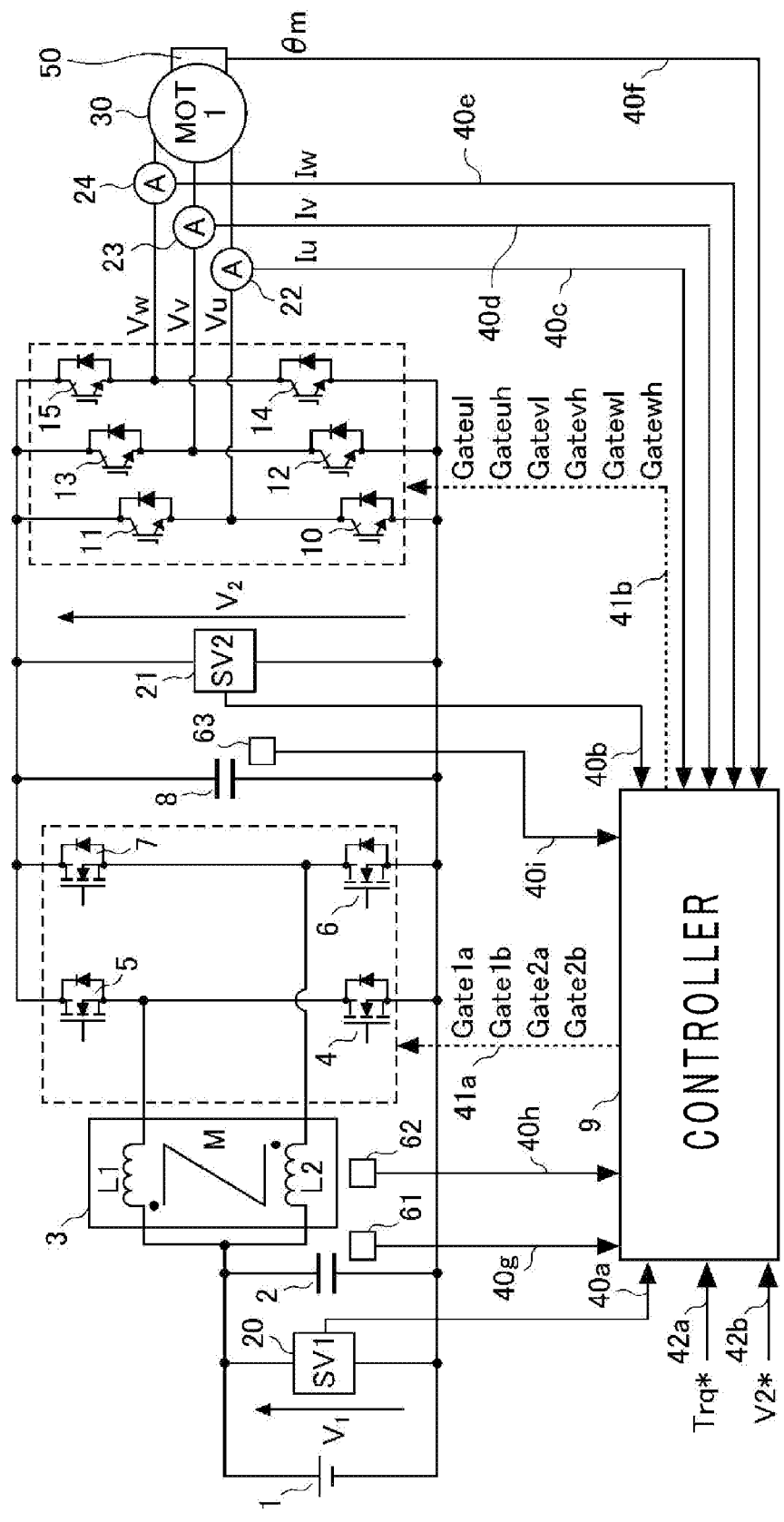
FIG. 1 is a schematic configuration diagram illustrating an electrical power conversion device according to Embodiment 1 of the present invention.

Hereinafter, the explanation will be made referring to the drawings for the exemplary embodiments of an electrical power conversion device according to the present invention. However, in each of the figures, the same reference numerals and symbols designate the same items as, or the items corresponding to, those shown in the drawings; thus, their explanation redundant thereto is omitted.

Embodiment 1

FIG. 1 is a schematic configuration diagram illustrating an electrical power conversion device according to Embodiment 1 of the present invention. The electrical power conversion device according to Embodiment 1 is constituted of a step-up or boost converter and an inverter. To an input of the boost converter, an electric energy storage device (also referred to as a "battery") 1 is connected, and, to an output of the inverter, an electric rotating machine 30 is connected. The electric energy storage device 1 outputs a DC voltage. Here, when the electrical power conversion device is applied to an electric automotive vehicle and a hybrid automotive vehicle, the electric energy storage device 1 is representatively made of a secondary battery of nickel metal hydride, lithium ion, or the like. The voltage of the electric energy storage device 1 takes on at least 100 V or more.

The boost converter is constituted of the elements from an input capacitor 2 through to a smoothing capacitor 8. In the electrical power conversion device, the input capacitor 2 is connected in parallel with the electric energy storage device 1 in order to remove a ripple current, and, on the downstream side of the input capacitor 2, a magnetically coupled reactor 3 is connected in which a reactor L1 and a reactor L2 are placed to magnetically couple with each other. Downstream of the magnetically coupled reactor 3, a semiconductor switching device 4 and a semiconductor switching device 5 being a first switching device pair and a semiconductor switching device 6 and a semiconductor switching device 7 being a second switching device pair are included, and, downstream of each of the switching device pairs, the smoothing capacitor 8 is connected. Namely, the boost converter includes the first semiconductor switching device 4 and the second semiconductor switching device 5 being connected in series between terminals of an output terminal of the boost converter on a positive electrode-side thereof and an output terminal of the boost converter on a negative electrode-side thereof, and the third semiconductor switching device 6 and the fourth semiconductor switching device 7 being connected in series between the output terminals on the positive electrode-side and on the negative electrode-side, toward the side of the output terminals of this converter more than that of the first and second semiconductor switching devices. Here, the semiconductor switching devices 4 through 7 are constituted of MOSFETs (Metal-Oxide-Semiconductor Field-Effect Transistors) made of a SiC (silicon carbide) semiconductor being a wide band-gap semiconductor which operates at a high withstand voltage, and is also good at heat dissipation properties and is capable of high speed switching. Power semiconductor switching devices each made of a wide band-gap semiconductor can be used in a high voltage region which is difficult to perform unipolar operations by an Si semiconductor, and also can perform fast switching in comparison with the Si semiconductor; and, because there exists no tail current at the time of turn-off such as that of an Si-IGBT (Insulated Gate Bipolar Transistor), switching losses caused at the time of switching can be largely reduced, so that it becomes possible to largely reduce electric power losses. In addition, because those switching devices' electric power losses are small and their heat resistance is also high, it is possible to achieve miniaturization of a radiating fin(s) of a heat sink and substitution from a water cooling portion to an air-cooling one, when a power module is made including a cooling portion therein, so that further miniaturization of the semiconductor module can be achieved. Moreover, a power semiconductor switching device made of a wide band-gap semiconductor is suitable for high-frequency switching operations.

As for the magnetically coupled reactor 3, a first winding indicated by the reactor L1 being connected between a connection point to the semiconductor switching device 4 together with the semiconductor switching device 5 and a positive electrode-side of the input capacitor 2, and a second winding indicated by the reactor L2 being connected between a connection point to the semiconductor switching device 6 together with the semiconductor switching device 7 and the positive electrode-side of the input capacitor 2 are wound on a common core mutually in a reverse direction so as to magnetically couple with each other at a turn ratio of "1:1."

The drain terminal of the semiconductor switching device 5 and the drain terminal of the semiconductor switching device 7 are each connected to a positive electrode-side of the smoothing capacitor 8, and the source terminal of the semiconductor switching device 4 and that of the semiconductor switching device 6 are each connected to a negative electrode-side of the smoothing capacitor 8. In addition, the source terminal of the semiconductor switching device 5 and the drain terminal of the semiconductor switching device 4, and the source terminal of the semiconductor switching device 7 and the drain terminal of the semiconductor switching device 4 are mutually connected to each other; and each of the connection points is connected to the magnetically coupled reactor 3.

Subsequently, by way of a control line 41a, a controller 9 performs the turn-on/turn-off control on the semiconductor switching devices 4 and 5, and on those 6 and 7 interposing their respective dead times having been predetermined.

Respective switching operations are performed in such a way that:
the MOSFET of the semiconductor switching device 4 is operated by means of a gate signal Gate1a outputted from the controller 9;
the MOSFET of the semiconductor switching device 5 is, by means of a gate signal Gate1b outputted from the controller 9; the MOSFET of the semiconductor switching device 6 is, by means of a gate signal Gate2a outputted from the controller 9; and the MOSFET of the semiconductor switching device 7 is, by means of a gate signal Gate2b outputted from the controller 9.

The semiconductor switching devices 4 through 7 are turned on when the respective gate signals Gate1a, Gate1b, Gate2a and Gate2b are signals High "H," and turned off when the respective gate signals Gate1a, Gate1b, Gate2a and Gate2b are signals Low "L."

In addition, the controller 9 obtains voltage detection values each from an input-voltage detection circuit 20 and an output-voltage detection circuit 21 by way of signal lines 40a and 40b, respectively. Respective symbol $V_1$ designates the input voltage, and symbol $V_2$, the output voltage.

Because, under actual circumstances, a harness or the like is connected between the boost converter of the electrical power conversion device and the electric energy storage device 1 placed outside the electrical power conversion device, a parasitic inductance component(s) is possessed therebetween; for this reason, the impedance therebetween is large at a high frequency, so that a ripple current of the electrical power conversion device flows though the input capacitor 2.

Next, the explanation will be made in more detail for the connections in the inverter.

Each of semiconductor switching devices 10 through 15 is constituted of an IGBT (insulated-gate bipolar transistor) made of an Si (silicon) semiconductor, and a diode made of an Si (silicon) semiconductor connected in antiparallel with the IGBT. The inverter outputs the DC voltage (output voltage) $V_2$ of the smoothing capacitor 8 to three-phase output terminals Vu, Vv and Vw as three-phase alternating currents after the inversion.

The three-phase output terminals of the inverter are connected to the electric rotating machine 30 made of an electric power generator, an electric motor or the like, and the three-phase alternating currents are supplied thereinto.

The emitter terminal of the IGBT of the semiconductor switching device 10 on a phase-U lower-arm side constituting the inverter is connected to the negative electrode-side of the smoothing capacitor 8, and the IGBT's collector terminal is connected to one three-phase output terminal Vu.

The emitter terminal of the IGBT of the semiconductor switching device 11 on a phase-U upper-arm side is connected to one three-phase output terminal Vu, and the IGBT's collector terminal is connected to the positive electrode-side of the smoothing capacitor 8.

The emitter terminal of the IGBT of the semiconductor switching device 12 on a phase-V lower-arm side is connected to the negative electrode-side of the smoothing capacitor 8, and the IGBT's collector terminal is connected to one three-phase output terminal Vv.

The emitter terminal of the IGBT of the semiconductor switching device 13 on a phase-V upper-arm side is connected to one three-phase output terminal Vv, and the IGBT's collector terminal is connected to the positive electrode-side of the smoothing capacitor 8.

The emitter terminal of the IGBT of the semiconductor switching device 14 on a phase-W lower-arm side is connected to the negative electrode-side of the smoothing capacitor 8, and the IGBT's collector terminal is connected to one three-phase output terminal Vw.

The emitter terminal of the IGBT of the semiconductor switching device 15 on a phase-W upper-arm side is connected to one three-phase output terminal Vw, and the IGBT's collector terminal is connected to the positive electrode-side of the smoothing capacitor 8.

By way of a control line 41b, the controller 9 performs the turn-on/turn-off control on the semiconductor switching devices 10 through 15 with their respective timings having been predetermined.

Respective switching operations are performed in such a way that:

the IGBT of the semiconductor switching device 10 is operated by means of a gate signal Gateul outputted from the controller 9;

the IGBT of the semiconductor switching device 11 is, by means of a gate signal Gateuh outputted from the controller 9;

the IGBT of the semiconductor switching device 12 is, by means of a gate signal Gatevl outputted from the controller 9;

the IGBT of the semiconductor switching device 13 is, by means of a gate signal Gatevh outputted from the controller 9;

the IGBT of the semiconductor switching device 14 is, by means of a gate signal Gatewl outputted from the controller 9; and the IGBT of the semiconductor switching device 15 is, by means of a gate signal Gatewh outputted from the controller 9.

Into the controller 9, inputted by way of signal lines 40c, 40d and 40e are three-phase electric currents Iu, Iv and Iw of the three-phase alternating currents between the three-phase output terminals Vu, Vv and Vw of the inverter and the electric rotating machine 30 which are detected by means of a phase-U electric current sensor 22, a phase-V electric current sensor 23 and a phase-W electric current sensor 24 being three-phase electric current sensors, respectively. A rotation angle sensor 50 detects a rotation angle θm of the electric rotating machine 30, and inputs it into the controller 9 by way of a signal line 40f. In addition, a torque instruction value Trq* of the electric rotating machine 30 and a DC voltage instruction value V2* are inputted into the controller 9 from outside thereof by way of signal lines 42a and 42b.

The gate signals Gateul, Gateuh, Gatevl, Gatevh, Gatewl and Gatewh of the inverter are controlled so that torque of the electric rotating machine 30 becomes equal to the torque instruction value Trq*. In addition, the gate signals Gate1a, Gate1b, Gate2a and Gate2b of the boost converter are controlled so that its DC voltage $V_2$ becomes equal to the DC voltage instruction value V2*. The controller 9 has a function to control three-phase currents of the inverter and a function to control the DC voltage $V_2$ at the output portion of the boost converter, and also individually obtains temperature detection values from temperature detection means 61 to 63 for detecting temperatures of the magnetically coupled reactor 3, the input capacitor 2 and the smoothing capacitor 8 (these capacitors are also referred to as "ripple current suppressing capacitors"); and, when at least any one temperature from these temperature detection means 61 to 63 exceeds a predetermined value defined in advance, the controller has a function to reduce the DC voltage $V_2$ because the controller limits the torque of the electric rotating machine 30 and the load output of the inverter so as to limit the electric current of the boost converter. It suffices to arrange that at least any one of these temperature detection means 61 to 63 is included.

Here, the explanation will be made for which, in the electrical power conversion device according to Embodiment 1, the semiconductor switching devices 4 through 7 of the boost converter are made of SiC-MOSFETs, whereas the semiconductor switching devices 10 through 15 of the inverter are made of Si-IGBTs. In recent years, miniaturization of an electrical power conversion device is desired. For this reason, miniaturization by means of high frequency performance is required, and so, there exists an SiC-MOSFET as a high frequency device in place of a conventional Si-IGBT. Meanwhile, because a SiC semiconductor is more expensive with respect to a Si semiconductor, the costs result in the increase when the SiC is utilized for all of the semiconductor switching devices 4 through 7, and those 10 through 15. In addition, even when a switching frequency of the semiconductor switching devices 10 through 15 on the inverter side is to achieve high-frequency performance, inductance components of the electric rotating machine 30 are sufficiently high in comparison with the inductance components of the magnetically coupled reactor 3 inside the boost converter, so that there exists approximately no contribution to miniaturization even when the inverter achieves high-frequency performance.

In an electrical power conversion device including an inverter(s) and a step-up or boost converter, generally, a reactor, capacitors, a cooling portion for cooling these components, and a wasteful space due to the difference in heights of the reactor, those capacitors and other components largely influence on an overall size. For this reason, in the electrical power conversion device according to Embodiment 1, the semiconductor switching devices 4 through 7 of the boost converter achieve high frequency performance by means of the SiC-MOSFETs, and also take on a multiple phase configuration in two phases or more, whereby core losses and a ripple current are suppressed, and miniaturization of the magnetically coupled reactor 3, the input capacitor 2 and the smoothing capacitor 8 is achieved. According to this arrangement, the costs increase by altering from Si semiconductor devices to the SiC semiconductor devices; however, the reduction of component costs is achieved by means of miniaturization of the reactor and the capacitors, and the costs of the cooling portion are curbed. Then in addition, in the inverter which does not contribute miniaturization by means of its high frequency performance, the semiconductor switching devices 10 through 15 are made of conventional Si-IGBTs, whereby the costs do not increase.

Accordingly, by utilizing expensive SiC semiconductor switching devices each in the right place at the right time, the electrical power conversion device is achieved in more compact size with low costs.

Hereinafter, the explanation will be made for operation principles of the electrical power conversion device according to Embodiment 1 of the present invention. In the electrical power conversion device according to Embodiment 1, there exist four operation modes each illustrated in FIG. 2 through FIG. 5 in accordance with a state of each of the semiconductor switching devices 4 through 7 of the boost converter. Note that, because FIG. 2 through FIG. 5 are diagrams each for explaining the operation modes, the controller 9 shown in FIG. 1 is omitted.

Figure 2:
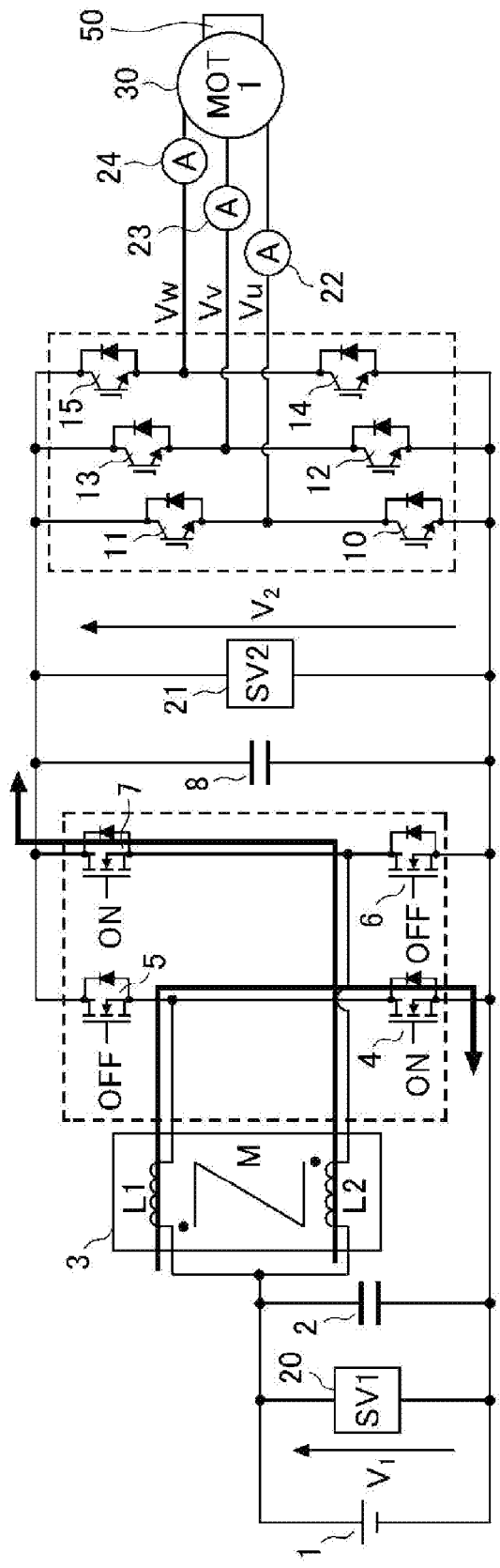
FIG. 2 is a diagram for explaining a changeover mode (Mode 1) of semiconductor switching devices in the electrical power conversion device according to Embodiment 1 of the present invention.
Figure 3:
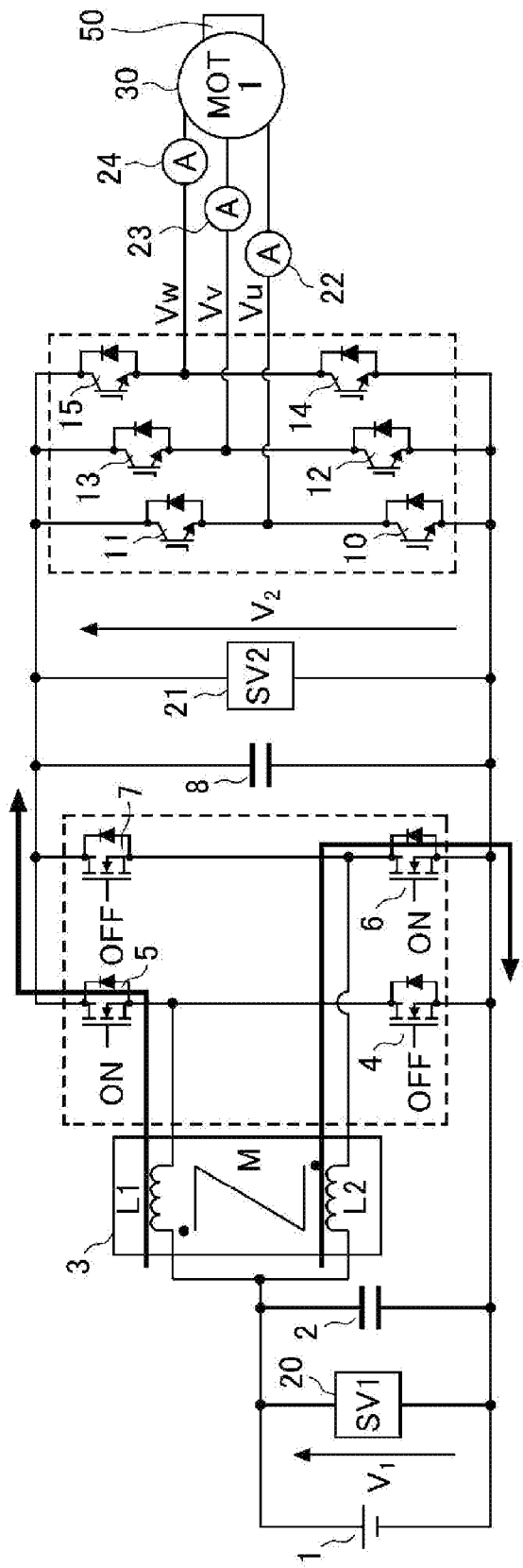
FIG. 3 is a diagram for explaining a changeover mode (Mode 2) of the semiconductor switching devices in the electrical power conversion device according to Embodiment 1 of the present invention.

Mode 1 illustrated in FIG. 2 is in a state in which the semiconductor switching device 4 is turned on, and the semiconductor switching device 6, turned off. Corresponding to the switching device pairs each, the semiconductor switching device 5 is turned off, and the semiconductor switching device 7, turned on. Mode 2 illustrated in FIG. 3 is in a state in which, on the contrary to Mode 1, the semiconductor switching device 4 is turned off, and the semiconductor switching device 6, turned on; and also, the semiconductor switching device 5 is turned on, and the semiconductor switching device 7, turned off.

Figure 4:
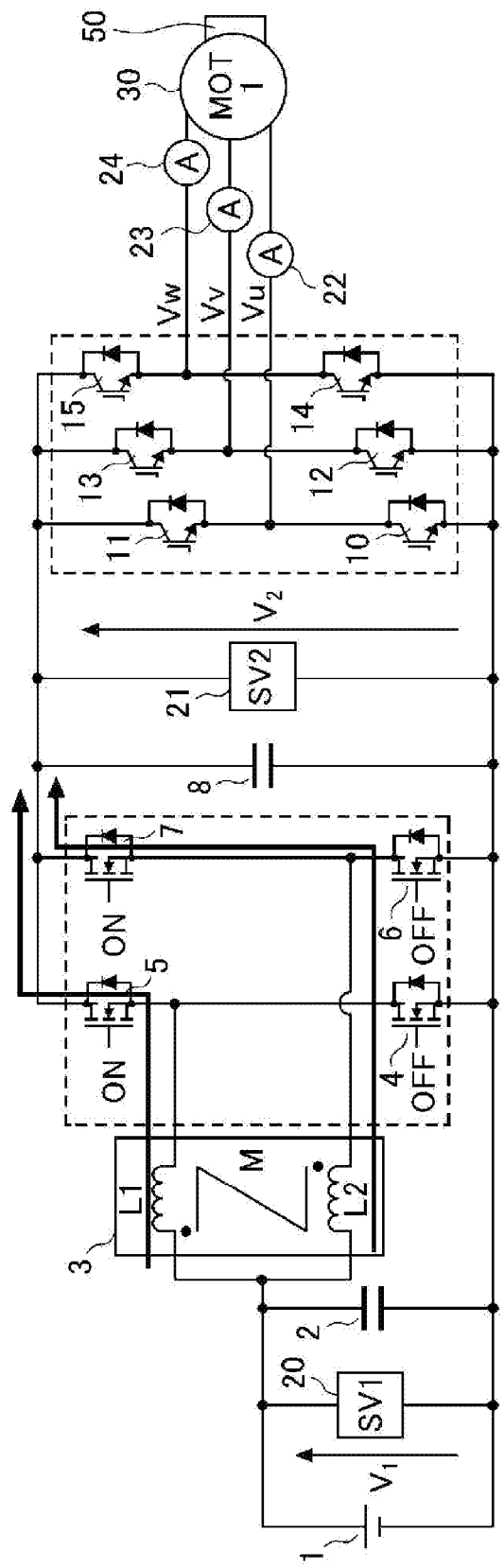
FIG. 4 is a diagram for explaining a changeover mode (Mode 3) of the semiconductor switching devices in the electrical power conversion device according to Embodiment 1 of the present invention.
Figure 5:
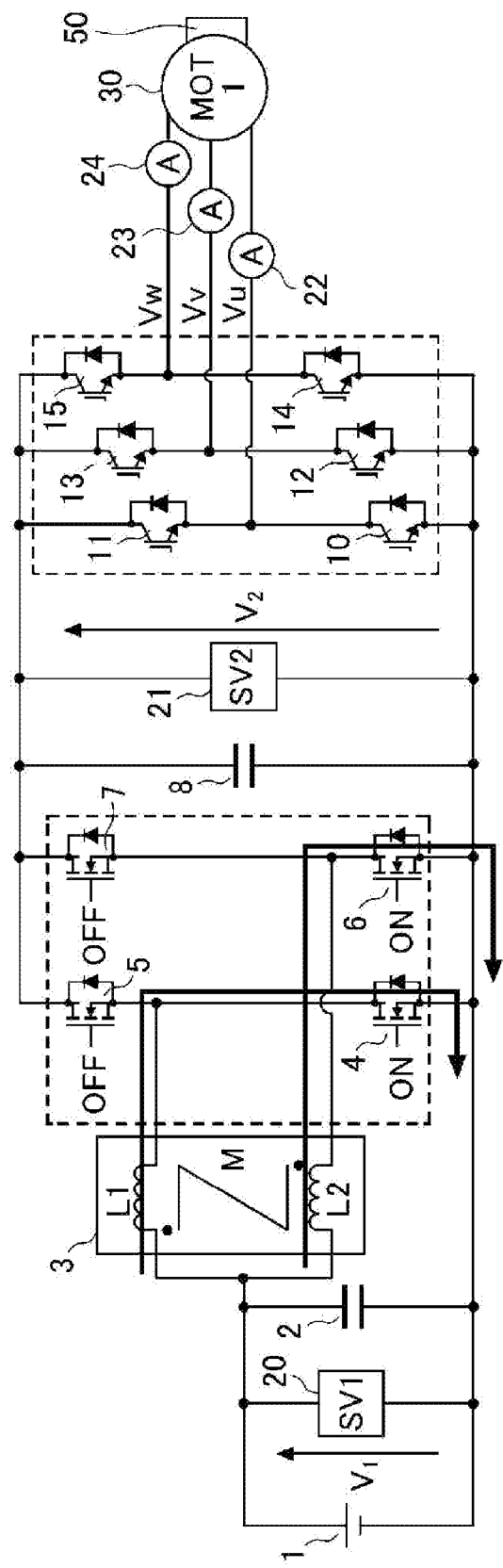
FIG. 5 is a diagram for explaining a changeover mode (Mode 4) of the semiconductor switching devices in the electrical power conversion device according to Embodiment 1 of the present invention.

Mode 3 illustrated in FIG. 4 is in a state in which the semiconductor switching device 4 and the semiconductor switching device 6 are both turned off, and the semiconductor switching device 5 and the semiconductor switching device 7, both turned on. Mode 4 illustrated in FIG. 5 is in a state in which, on the contrary to Mode 3, the semiconductor switching device 4 and the semiconductor switching device 6 are both turned on, and the semiconductor switching device 5 and the semiconductor switching device 7, both turned off.

Because the controller 9 shown in FIG. 1 controls so that a phase of the semiconductor switching device 4 and that of the semiconductor switching device 6 are displaced by half a period (the phase is shifted by 180°), an appearance pattern of circuit operations changes with a boundary of a duty ratio (D) 0.5 of switching. When the duty ratio is smaller than 0.5 (D<0.5), a pattern of Mode 1→Mode 3→Mode 2→Mode 3 is repeated with respect to each period; and, when the duty ratio is larger than 0.5 (D>0.5), a pattern of Mode 1→Mode 4→Mode 2→Mode 4 is repeated therewith. When the duty ratio is 0.5 (D=0.5), the patterns of Mode 1 and Mode 2 are alternately repeated.

Here, the explanation will be made for a reason why the implementation is taken on an interleaved driving configuration in which the controller 9 controls so that a phase of the semiconductor switching device 4 and that of the semiconductor switching device 6 are displaced by half a period (the phase is shifted by 180°).

Figure 6:
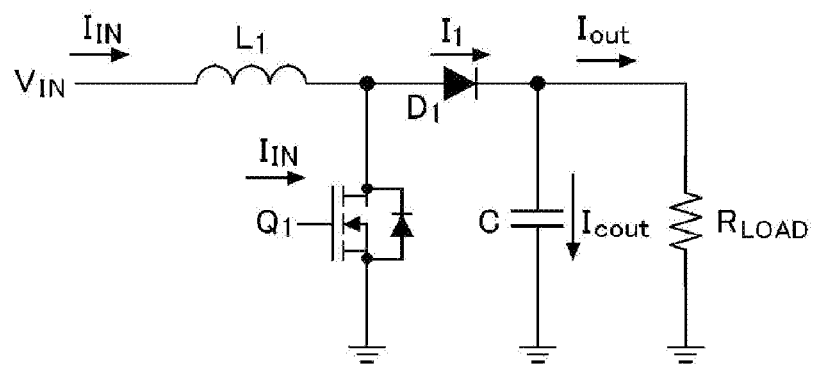
FIG. 6 is a circuit diagram of a single transistor type circuit when a load current on an inverter side is assumed to be constant.
Figure 7:
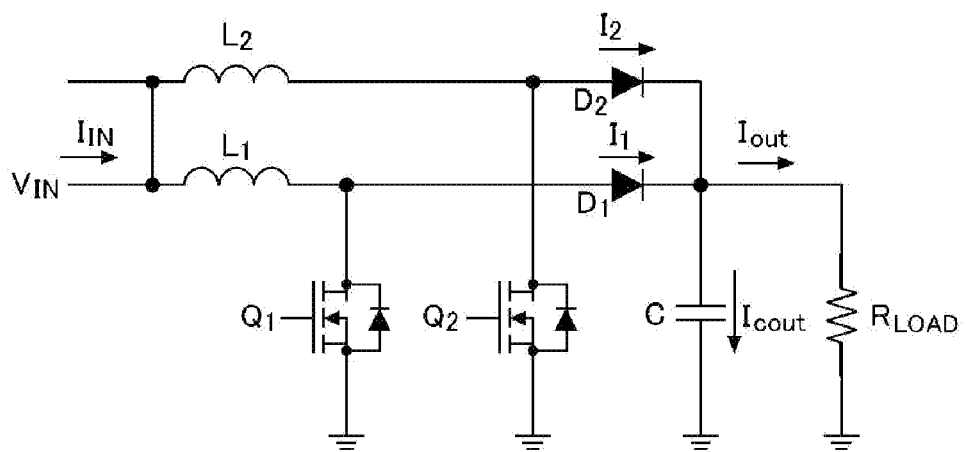
FIG. 7 is a circuit diagram of an interleaved circuit when a load current on an inverter side is assumed to be constant.
Figure 8:
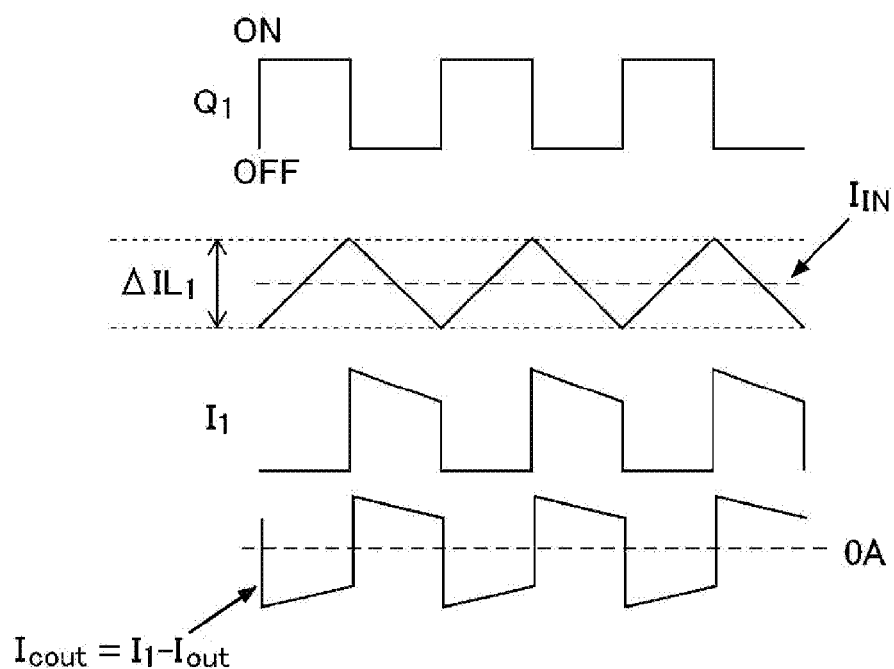
FIG. 8 is a diagram illustrating electric current waveforms of the single transistor type circuit in FIG. 6.
Figure 9:
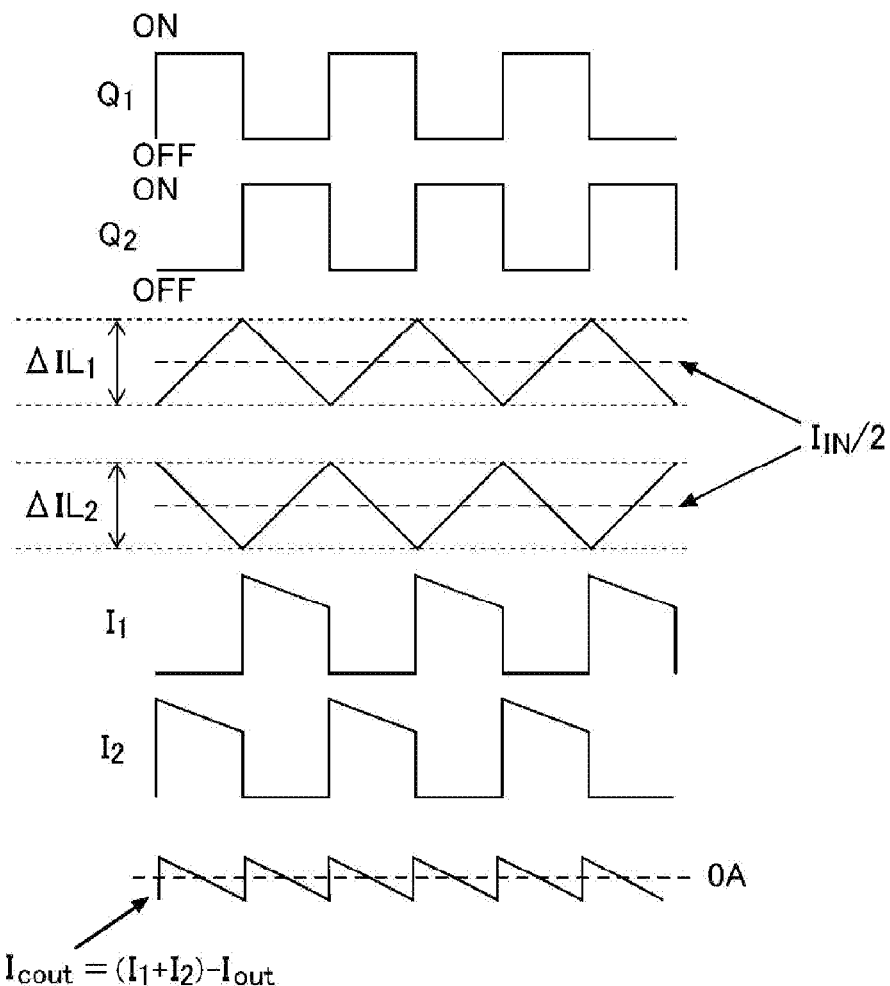
FIG. 9 is a diagram illustrating electric current waveforms of the interleaved circuit in FIG. 7.

In general, when a ripple current is considered in the single transistor type converter circuit as in FIG. 6 or in the interleaved converter circuit as in FIG. 7, by assuming that a load current on the inverter side is constant, an electric current flowing through the capacitor in the output stage in each of the circuits (also referred to as a "ripple current"), Icout, is brought as in FIG. 8 and FIG. 9, respectively.

Figure 10:
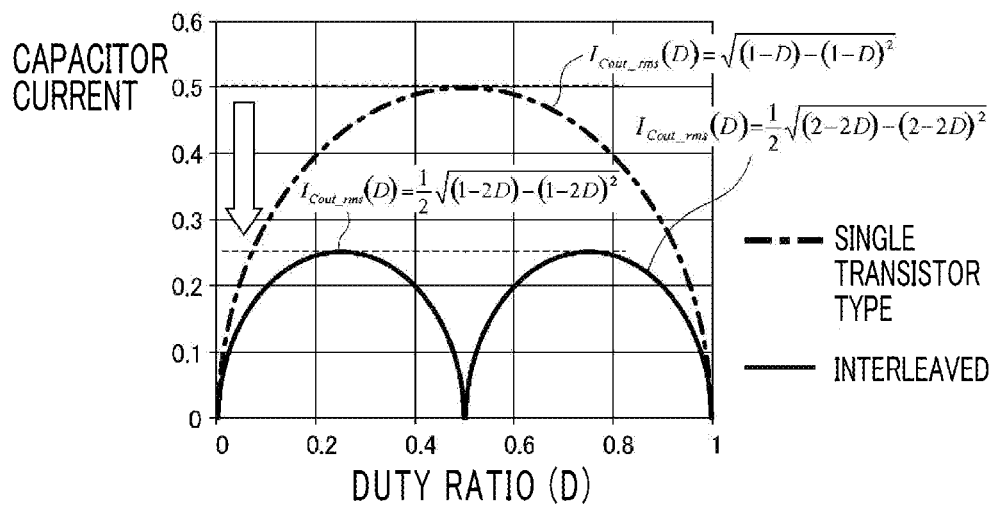
FIG. 10 is a diagram showing the relationship between a switching duty and a ripple-current's root-mean-square value of a capacitor in each of the circuits of FIG. 6 and FIG. 7.

The relationship between the capacitor current Icout at these times and a turn-on duty ratio (D) of switching is shown in FIG. 10. The alternate long and short dashed lines in the same figure show characteristics in a case of a configuration of the single transistor type circuit, and the solid lines, those in a case of a configuration of the interleaved circuit.

According to FIG. 10, it can be understood that, by applying the configuration of interleaved circuit, the maximum value of an electric current thereby can be suppressed down to half of that of an electric current by the single transistor type.

Accordingly, it can be understood that a ripple current of the smoothing capacitor 8 depends on a load current on the inverter side, and also that the ripple current is suppressed by taking on a multiple phase configuration. For this reason, as for the ripple current of the smoothing capacitor 8, the ripple current is suppressed by taking on the multiple phase configuration, so that the smoothing capacitor 8 is made more compact. Moreover, by reducing a "ripple current width" of a reactor(s) by means of its high frequency performance, a ripple current of the smoothing capacitor 8 is lowered.

However, in a usual interleaved circuit, reactors are required in two. Because the electric current is distributed, it is possible to reduce the size of the reactors themselves in comparison with a reactor of the single transistor type circuit; however, under actual circumstances, it is required to secure the distance by taking in consideration of the insulation between the reactors, and thus, there exists a limit to miniaturization of the reactors when the electrical power conversion device is viewed in its entirety. For this reason, in the boost converter of Embodiment 1, a circuit configuration is taken by using the magnetically coupled reactor, whereby the reactor is implemented in one-reactor configuration, and, whilst the ripple current of the smoothing capacitor 8 is suppressed in a similar manner to the interleaved circuit, the number of components can be reduced.

Figure 11:
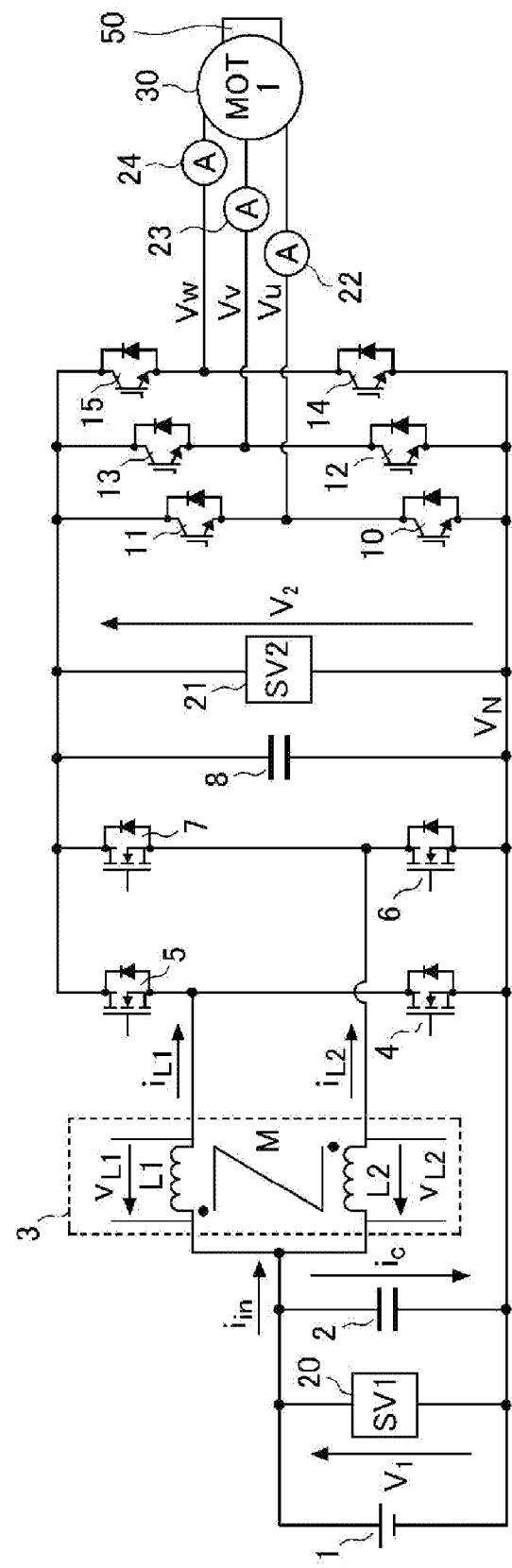
FIG. 11 is a circuit diagram for explaining a configuration of a boost converter in the electrical power conversion device according to Embodiment 1 of the present invention.

The explanation will be made for a circuit configuration of the boost converter in the electrical power conversion device according to Embodiment 1 referring to a circuit diagram of FIG. 11. As shown in FIG. 11, the following relational Expression (1) is held, when inductances in the magnetically coupled reactor 3 are defined as self inductances $L_1$ and $L_2$, and a mutual inductance M; when voltages applied to windings, namely, to the reactors L1 and L2 are defined as voltages $v_{L1}$ and $v_{L2}$; and when electric currents flowing through the windings, namely, through the respective reactors L1 and L2 are defined as electric currents $i_{L1}$ and $i_{L2}$, and a combined electric current of these is defined as the combined electric current $i_{in}$.

[Expression Figure 1]

$$\begin{cases} V_{L1} = L_1 \cdot \frac{di_{L1}}{dt} - M \cdot \frac{di_{L2}}{dt} \\ V_{L2} = L_2 \cdot \frac{di_{L2}}{dt} - M \cdot \frac{di_{L1}}{dt} \\ i_{in} = i_{L1} + i_{L2} \end{cases} \quad (1)$$

From Mode 1 to Mode 4, the voltages $v_{L1}$ and $v_{L2}$ each being applied change, and so, the behavior of electric currents changes in every one of the modes.

According to FIG. 2, in Mode 1, the semiconductor switching device 4 is turned on, and the semiconductor switching device 6 is turned off, and so, derived are: $v_{L1}=V_1$, and $v_{L2}=V_1-V_2$. By substituting these into Expression (1) and performing sorting out, next Expression (2) is given.

[Expression Figure 2]

$$\begin{cases} \frac{di_{L1}}{dt} = \frac{1}{L_1 \cdot L_2 - M^2} \cdot \{(L_2 + M) \cdot V_1 - M \cdot V_2\} \\ \frac{di_{L2}}{dt} = \frac{1}{L_1 \cdot L_2 - M^2} \cdot \{(L_1 + M) \cdot V_1 - L_1 \cdot V_2\} \\ \frac{di_{in}}{dt} = \frac{di_{L1}}{dt} + \frac{di_{L2}}{dt} \end{cases} \quad (2)$$

Here, because the design is usually carried out so that parameters of the phases are made symmetrical with one another, Expression (2) can be expressed as a simpler one as next Expression (3) by assuming that the parameters of the phases are completely symmetrical with one another, so that $L_1=L_2=L$.

[Expression Figure 3]

$$\begin{cases} \frac{di_{L1}}{dt} = \frac{1}{L^2 - M^2} \cdot \{(L + M) \cdot V_i - M \cdot V_o\} \\ \frac{di_{L2}}{dt} = \frac{1}{L^2 - M^2} \cdot \{(L + M) \cdot V_i - L \cdot V_o\} \\ \frac{di_{in}}{dt} = \frac{2}{L - M} \cdot \left(V_i - \frac{V_o}{2}\right) \end{cases} \quad (3)$$

Similarly, it is solved for Mode 2 of FIG. 3. Mode 2 is expressed by next Expression (4), because the switching state is in a state corresponding to a reverse rotation of Mode 1, so that the behavior of electric currents of the phases each also reverses.

[Expression Figure-4]

$$\begin{cases} \frac{di_{L1}}{dt} = \frac{1}{L^2 - M^2} \cdot \{(L+M) \cdot V_i - L \cdot V_o\} \\ \frac{di_{L2}}{dt} = \frac{1}{L^2 - M^2} \cdot \{(L+M) \cdot V_i - M \cdot V_o\} \\ \frac{di_{in}}{dt} = \frac{2}{L-M} \cdot \left(V_i - \frac{V_o}{2}\right) \end{cases} \quad (4)$$

In Mode 3 of FIG. 4, Mode 3 is a mode in which both of the switches on the negative electrode-side are turned off, which results in: $v_{L1}=v_{L2}=V_1-V_2$. By substituting these into Expression (1) and performing sorting out, next Expression (5) is given thereby.

[Expression Figure-5]

$$\begin{aligned} \frac{di_{L1}}{dt} &= \frac{di_{L2}}{dt} = \frac{1}{L-M} \cdot (V_o - V_i) \\ \frac{di_{in}}{dt} &= \frac{2}{L-M} \cdot (V_o - V_i) \end{aligned} \quad (5)$$

In Mode 4 of FIG. 5, Mode 4 is a mode in which both of the switches on the negative electrode-side are turned on, which results in: $v_{L1}=v_{L2}=Vi$. By substituting these into Expression (1) and performing sorting out, next Expression (6) is given thereby.

[Expression Figure-6]

$$\begin{aligned} \frac{di_{L1}}{dt} &= \frac{di_{L2}}{dt} = \frac{1}{L-M} \cdot V_i \\ \frac{di_{in}}{dt} &= \frac{2}{L-M} \cdot V_i \end{aligned} \quad (6)$$

Figure 12:
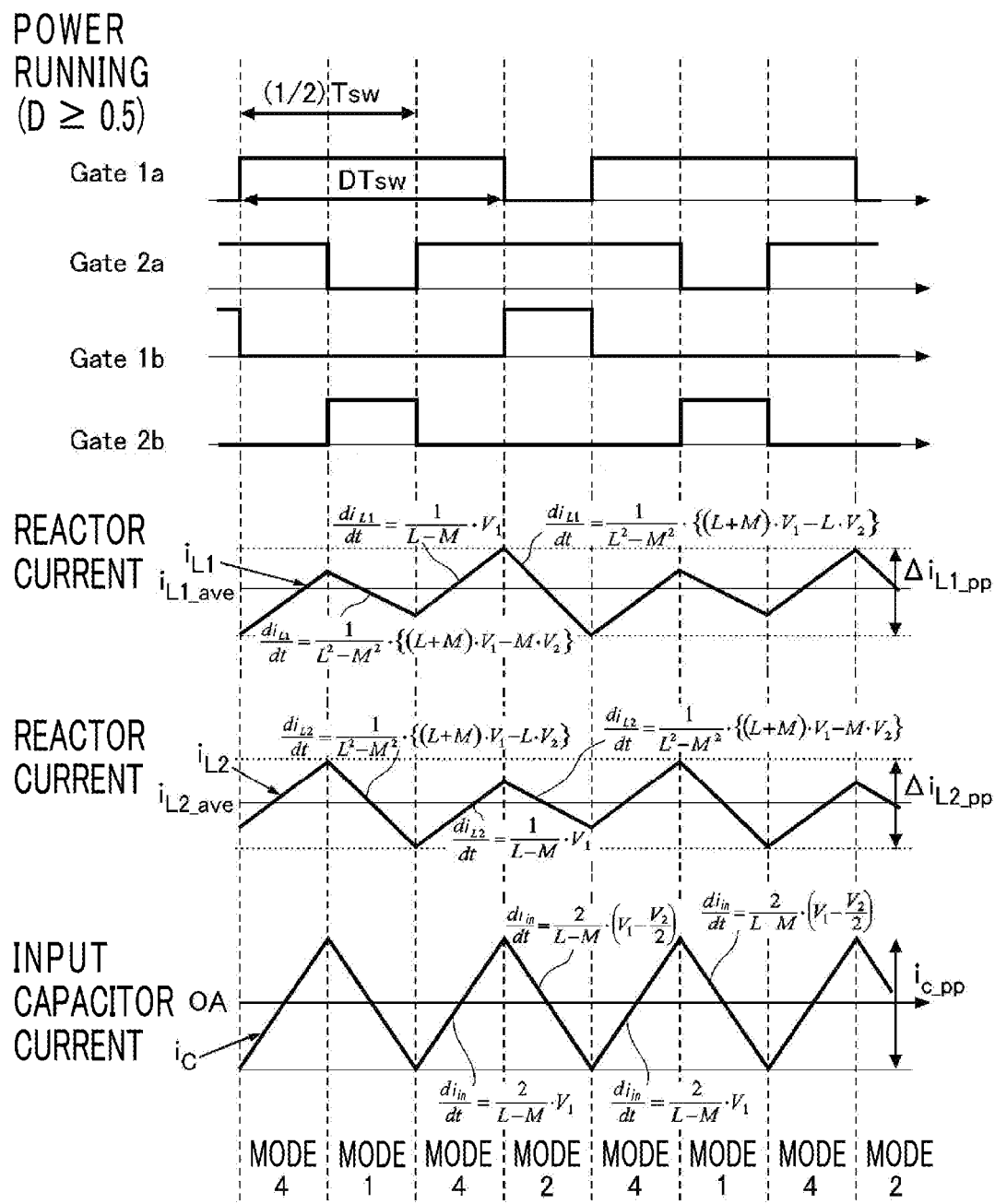
FIG. 12 is a diagram illustrating time charts of signals and electric currents at respective portions of the electrical power conversion device according to Embodiment 1 of the present invention.

As described above, each of voltage and electric current waveforms of the electrical power conversion device is illustrated in FIG. 12 as an operation example, when a duty ratio is larger than "0.5" in power running (D>0.5). Here, an electric current $i_c$ flowing through the input capacitor 2 is an alternating-current component of a combined electric current $i_{in}$. In addition, symbols fsw and Tsw designate a switching frequency of the semiconductor switching devices and a switching period thereof, respectively.

Here, according to FIG. 12, the maximum value of an electric current ($i_{L1}$, $i_{L2}$) flowing through each of the reactors is given by next Expression (7), when a mean or average value of electric current flowing in each of the phases is defined as $i_{L1\_ave}$, $i_{L2\_ave}$, respectively.

[Expression Figure-7]

$$\begin{cases} i_{L1\_max} = i_{L1\_ave} + \frac{\Delta i_{L1\_pp}}{2} = i_{L1\_ave} + \frac{1}{2} \cdot (1-D) \cdot \frac{1}{f_{sw}} \cdot \\ \qquad\qquad \left[\frac{1}{L^2 - M^2} \cdot \{(L+M) \cdot V_1 - L \cdot V_2\}\right] \\ i_{L2\_max} = i_{L2\_ave} + \frac{\Delta i_{L2\_pp}}{2} = i_{L2\_ave} + \frac{1}{2} \cdot (1-D) \cdot \frac{1}{f_{sw}} \cdot \\ \qquad\qquad \left[\frac{1}{L^2 - M^2} \cdot \{(L+M) \cdot V_1 - L \cdot V_2\}\right] \end{cases} \quad (7)$$

According to Expression (7), the maximum value ($i_{L1\_max}$, $i_{L2\_max}$) of each of the electric currents is designed to stay within an allowable electric current value of an electric current sensor.

In addition, according to FIG. 12, a root-mean-square value ($i_{c\_rms}$) of an electric current flowing through the input capacitor 2 is given by next Expression (8).

[Expression Figure-8]

$$i_{c\_rms} = \frac{i_{c\_pp}}{2\sqrt{3}} = \frac{1}{2\sqrt{3}} \cdot \frac{2 \cdot V_i}{L-M} \cdot \left(D - \frac{1}{2}\right) \cdot \frac{1}{f_{sw}} = \frac{1}{\sqrt{3}} \cdot \frac{V_i}{L-M} \cdot \left(D - \frac{1}{2}\right) \cdot \frac{1}{f_{sw}} \quad (8)$$

From Expression (8), it can be understood that the relationship between a ripple current of the input capacitor 2 and a switching frequency of the semiconductor switching devices 4 through 7 takes on an inversely proportional one. For this reason, the semiconductor switching devices 4 through 7 are made of the SiC-MOSFETs which enable their high-frequency driving, whereby the ripple current is suppressed by means of high-frequency switching, and an amount of heat liberated is curbed, so that the input capacitor 2 can be made more compact. In addition, similarly by means of the high-frequency driving, the ripple current can be suppressed even when the self inductances of the reactors and a value of the mutual inductance thereof are small, and so, the magnetically coupled reactor 3 can be made smaller in size.

Moreover, in the boost converter of Embodiment 1, the switching frequency of the semiconductor switching devices 4 through 7 is set at least at 20 kHz or more. This is because, by taking on an audible frequency range (20 Hz to 20 kHz) or more, whine and hum sounds of a magnetic component(s) and capacitors can be prevented, and the costs required for the prevention of the sounds conventionally necessary to do so can be cut short.

As described above, in the electrical power conversion device according to Embodiment 1, the semiconductor switching devices 4 through 7 are made of SiC-MOSFETs, whereby not only miniaturization of the magnetic component and the capacitors and cost reduction thereof, but also the costs required for curbing whine and hum sounds of the magnetic component and the capacitors can be reduced. Because an SiC-MOSFET is able to perform high-temperature operations, and also to operate at a high withstand voltage, an effect is exerted more on applications such as onboard devices of an electric automotive vehicle in which a battery voltage is high (at least 100 V or more) and the operations are demanded under high-temperature environments.

Embodiment 2

The explanation will be made for an electrical power conversion device according to Embodiment 2 of the present invention. A circuit configuration of the electrical power conversion device in Embodiment 2 is the same as that in Embodiment 1.

When a coupling factor between the reactor L1 of the magnetically coupled reactor 3 and the reactor L2 thereof is defined as "k," the relationship between the mutual inductance M, and the self inductances $L_1$ and $L_2$ is given as next Expression (9).

Expression Figure-9

$$M = k\sqrt{L_1 \cdot L_2} \approx k \cdot L \qquad (9)$$

According to this, by substituting Expression (9) into Expression (7) and Expression (8), next Expression (10) is given.

[Expression Figure-10]

$$i_{L1\_max} = i_{L1\_ave} + \frac{1}{2} \cdot (1-D) \cdot T_{sw} \cdot \left( \frac{V_1}{L \cdot (1-k)} - \frac{V_2}{L \cdot (1-k^2)} \right) \qquad (10)$$

$$i_{L2\_max} = i_{L2\_ave} + \frac{1}{2} \cdot (1-D) \cdot T_{sw} \cdot \left( \frac{V_1}{L \cdot (1-k)} - \frac{V_2}{L \cdot (1-k^2)} \right)$$

$$i_{c\_rms} = \frac{1}{\sqrt{3}} \cdot \frac{V_1}{L(1-k)} \cdot \left( D - \frac{1}{2} \right) \cdot T_{sw}$$

Here, according to Expression (10), a method is conceivable in which, on a condition in which the maximum value $i_{L1\_max}$, $i_{L2\_max}$ of a ripple current in each phase takes on an allowable electric current value of an electric current sensor or less, a self inductance L is in general made larger as a method in order to reduce a ripple-current's root-mean-square value $i_{c\_rms}$ of the input capacitor 2. However, making the self inductance L larger results in the increase of the number of windings, the increase of the core being an iron core and the like, so that caused are the increase of the costs for the magnetically coupled reactor 3, and the increase of conduction losses due to the increase of windings.

For dealing therewith, in the electrical power conversion device according to Embodiment 2 of the present invention, a ripple-current's root-mean-square value $i_{c\_rms}$ of the input capacitor 2 is made smaller by reducing the coupling factor "k" without increasing the self inductances $L_1$ and $L_2$.

According to Expression (10), even when the self inductance L is large, a "ripple current width" results in the increase when the coupling factor is high, for example, when k≅1.

Figure 13:
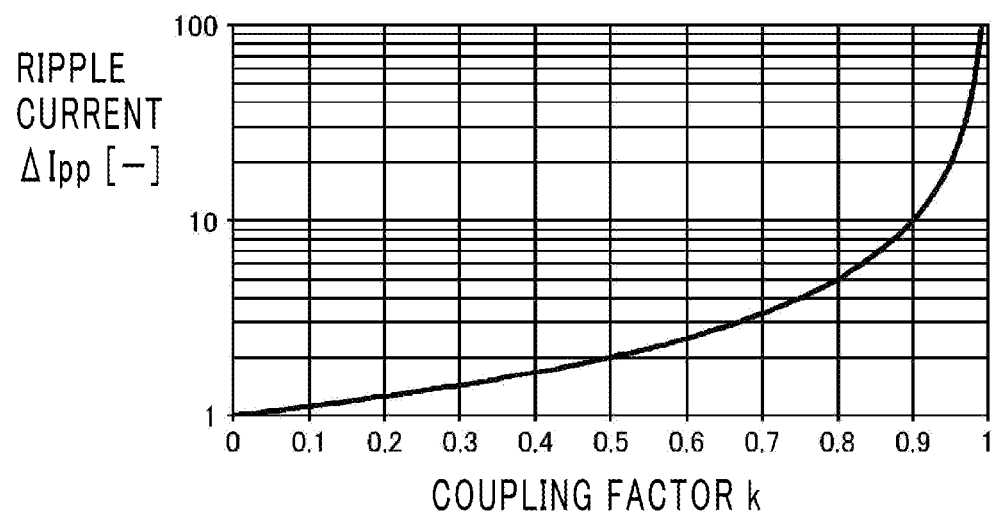
FIG. 13 is a diagram showing the relationship between a ripple current of an input capacitor and a coupling factor of a magnetically coupled reactor in an electrical power conversion device according to Embodiment 2 of the present invention.

In FIG. 13, the relationship between the coupling factor k and a ripple current width at each of coupling factors is shown in which a boost voltage ratio is "2" or more ($V_o/V_i \geq 2$), and at a time when a ripple current ΔIpp is defined as "1" at the coupling factor k=0. The ripple current width denotes a normalized value when a ripple current's component is defined as "1" at the coupling factor k=0. According to FIG. 13, it can be understood that the ripple current width sharply increases subsequently after the coupling factor exceeds 0.8. For this reason, the coupling factor is desirable to be 0.8 at the maximum or less. That is to say, the coupling factor of the magnetically coupled reactor 3 is preferably set at, for example, 0.8.

According to the manner described above, the coupling factor of the magnetically coupled reactor 3 is set at a preselected value or less by taking in consideration of the range where the ripple current of the input capacitor sharply increases in accordance with an increase of the coupling factor.

As described above, in order to miniaturize the reactor and the capacitors which largely contribute to the size of the electrical power conversion device, the magnetically coupled reactor is included in the boost converter, and SiC semiconductors are applied to the semiconductor switching devices in the electrical power conversion device in each of the embodiments described above, whereby the miniaturization of the reactor and the capacitors is achieved.

Figure 14:
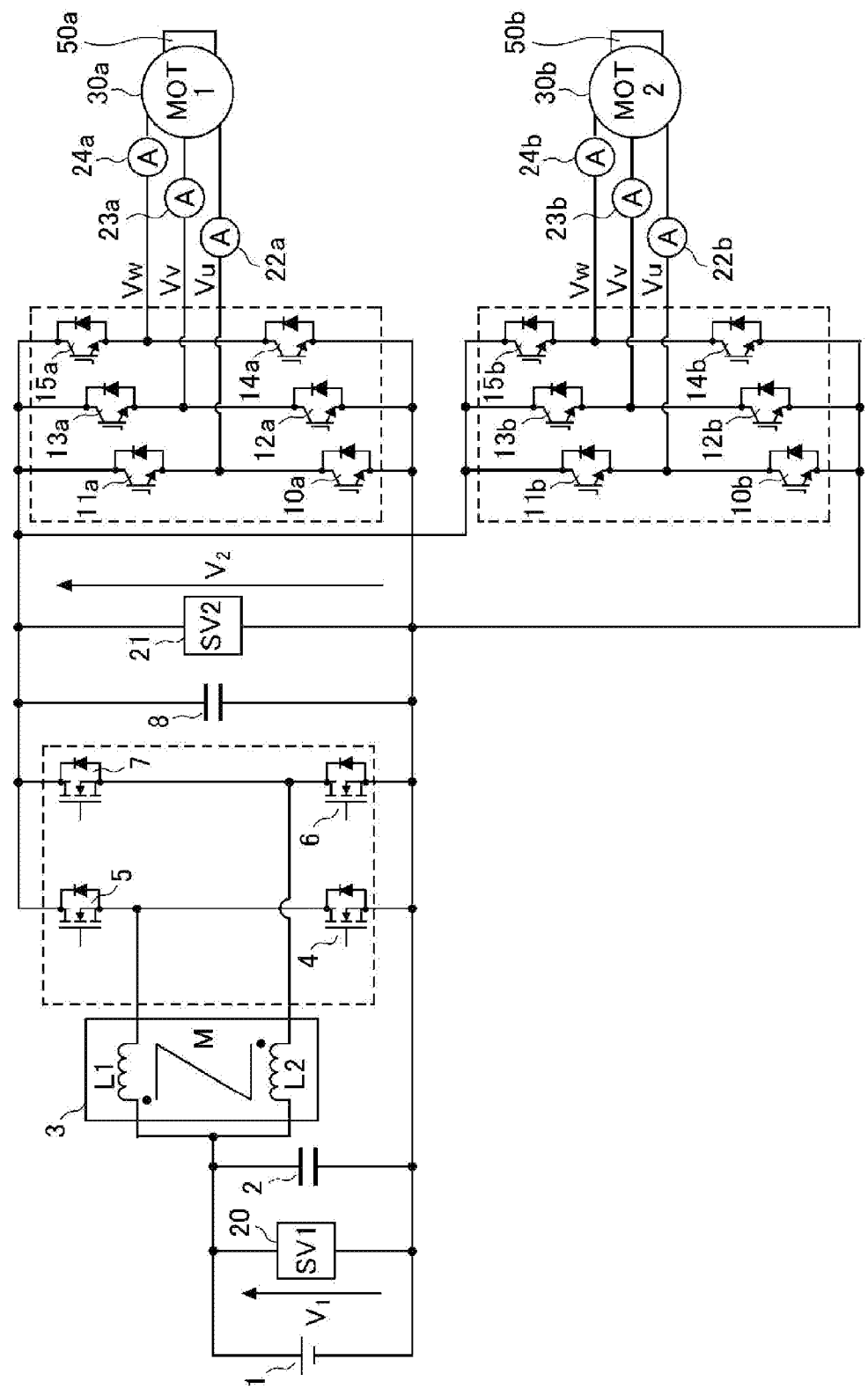
FIG. 14 is a schematic configuration diagram illustrating a modification example for the electrical power conversion devices according to Embodiments 1 and 2 of the present invention.

In the electrical power conversion device according to each of the embodiments described above, the configuration is taken in which the boost converter and the inverter are combined with each other; however, it is not necessarily limited to this. For example, a configuration may also be suitable in which the boost converter and two inverters are combined with one another as shown in FIG. 14.

In this case, one side (for example, an electric rotating machine 30a) is used for a motor to drive motions, and the other side (for example, an electric rotating machine 30b) is operated as a motor to generate electric power.

In each of the embodiments described above, not only a power running operation but also a regenerative operation are made possible by providing the switching devices for the semiconductor switching devices 5 and 7; however, it is not necessarily limited to this. For example, those devices may also be simply rectifier diodes, which can achieve similar effects.

It should be noted that, in each of the embodiments described above, SiC-MOSFETs are utilized for the semiconductor switching devices 4 through 7; however, semiconductor switching devices which utilize GaN (gallium nitride) as a semiconductor with the same wide band gap may also be suitable for.

In the present invention, each of the embodiments can be freely combined, and/or each of the embodiments can be appropriately modified or eliminated without departing from the scope of the invention.

EXPLANATION OF NUMERALS AND SYMBOLS

Symbol "1," designates an electric energy storage device; "2," input capacitor; "3," magnetically coupled reactor; "4," to "7," semiconductor switching device (SiC-MOSFET); "8," smoothing capacitor; controller; "10," to "15," semiconductor switching device (Si-IGBT); "20," input-voltage detection circuit; "21," output-voltage detection circuit; and "61," to "63," temperature detection means.

What is claimed is:
1. An electrical power conversion device, comprising:
a boost converter connected to an electric energy storage device, the boost converter comprising a magnetically coupled reactor including a first winding and a second winding, whereby the first winding and the second winding are wound on a common core in a mutually reverse direction so as to magnetically couple with each other at a turn ratio of one to one;
an inverter connected on an output side of the boost converter; and a controller for performing a turn-on/turn-off control on semiconductor switching devices of the boost converter and on semiconductor switching devices of the inverter, wherein the semiconductor switching devices of the boost converter are made of an SiC semiconductor, and the semiconductor switching devices of the inverter are made of an Si semiconductor, and wherein a coupling factor of the magnetically coupled reactor is set at a preselected value or less by taking in consideration of a range where a ripple current of an input capacitor sharply increases in accordance with an increase of the coupling factor.

2. The electrical power conversion device as set forth in claim 1, wherein a switching frequency of the semiconductor switching devices of the boost converter is set at twenty kilohertz or more.

3. The electrical power conversion device as set forth in claim 1, wherein a voltage of the electric energy storage device is one hundred volts or more.

4. The electrical power conversion device as set forth in claim 1, wherein the boost converter takes on a multiple phase configuration in two phases or more.

5. The electrical power conversion device as set forth in claim 4, wherein the boost converter further comprises:
a first semiconductor switching device and a second semiconductor switching device being connected in series between terminals of an output terminal of the boost converter on a positive electrode-side thereof and an output terminal of the boost converter on a negative electrode-side thereof;
a third semiconductor switching device and a fourth semiconductor switching device being connected in series between the output terminals on the positive electrode-side and on the negative electrode-side, toward a side of the output terminals more than that of the first semiconductor switching device and the second semiconductor switching device; and the input capacitor, for use in suppressing a ripple current, whose one end is connected to an input terminal of the electric energy storage device on its positive electrode-side and to an input side of the magnetically coupled reactor, and whose another end is connected between an input terminal of the electric energy storage device on its negative electrode-side and the negative electrode-side of the output terminals, wherein the first winding of the magnetically coupled reactor is connected between a connection point to the first semiconductor switching device together with the second semiconductor switching device and an input terminal of the electric energy storage device on a positive electrode-side, and wherein the second winding of the magnetically coupled reactor is connected between a connection point to the third semiconductor switching device together with the fourth semiconductor switching device and an input terminal of the electric energy storage device on the positive electrode-side.

6. The electrical power conversion device as set forth in claim 5, wherein a coupling factor of the magnetically coupled reactor is set at 0.8 or less.

7. The electrical power conversion device as set forth in claim 5, wherein the controller comprises a temperature detector for detecting a temperature of the magnetically coupled reactor or that of the input capacitor and an output voltage of the boost converter is reduced when a temperature detected by the temperature detector exceeds a value defined in advance.

* * * * *